C. GERSTEN.
Lahtern.
No. 2,765. Reissued Sept. 17, 1867.
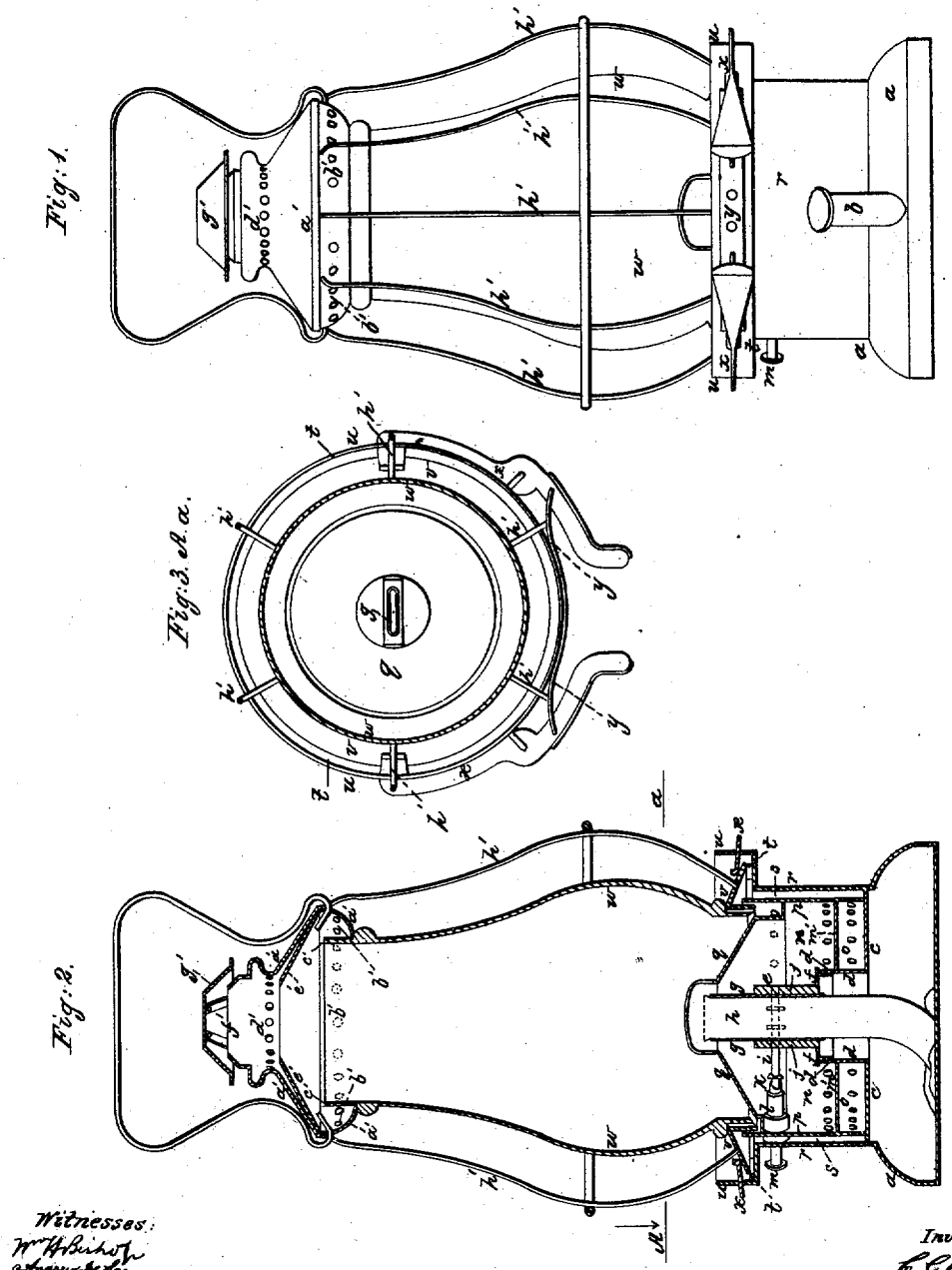
Witnesses:
Wm H Bishop
Andrew Bedley
Inventor:
C Gersten
N. PETERS, Photo-Lithographer, Washington, D. C.

United States Patent Office.

WILLIAM WESTLAKE AND JAMES F. DANE, OF NEW YORK, N. Y., ASSIGNEES OF CONRAD GERSTEN.

*Letters Patent No.* 22,723, *dated January* 25, 1859; *reissue No.* 2,765, *dated September* 17, 1867.

IMPROVEMENT IN LANTERNS.

The Schedule referred to in these Letters Patent and making part of the same.

TO ALL WHOM IT MAY CONCERN:

Be it known that CONRAD GERSTEN, of the city of Brooklyn, in the county of Kings, and State of New York, invented certain new and useful Improvements in Lanterns for Burning Coal Oils; and we do hereby declare that the following is a full, clear, and exact description of the same, reference being had to the accompanying drawings, in which—

Figure 1 is a side elevation of the lantern.

Figure 2 a vertical central section, and

Figure 3 a horizontal section taken at the line A *a* of fig. 2.

Like letters indicate the same parts in all of the figures.

The lanterns which have heretofore been made for burning coal oils will not admit of being moved through the atmosphere with any degree of velocity, or of being exposed to the wind without being extinguished and unsteady currents of air affect the flame so as to cause them to smoke to a very considerable extent.

The object of this invention is to avoid the defects above enumerated, and others not necessary to enumerate; and to these ends said invention consists in so controlling the supply of air to feed the flame that it cannot be affected within the lantern by any agitation of the air outside; and said invention also consists in keeping the oil-chamber cool, (which we consider important in lamps for burning that class of oils,) by interposing an air-chamber between the oil-chamber and what may be termed the burner or flame-chamber, so that by the circulation of air in the said cooling-chamber the oil will be prevented from being heated; and said invention also consists in providing a lantern with a deflecting plate or deflector, located above the holes for the admission of air, so as to direct the air admitted into the lantern towards and on to the flame.

In the accompanying drawings, *a* represents the pedestal, which is hollow to form a reservoir to contain the oil, and is provided with a tube, *b*, outside, and a cup-screw, through which the oil is to be supplied. The upper plate *c* of this oil-reservoir has a central hole, provided with a cylindrical tube, *d*, which extends up the required height, and to the upper end of which is fitted a burner, *e*, of the usual construction. The wick is moved up and down by the ratchet-wheels on a spindle, *i*. The end of this spindle is made to fit in the end of another spindle, or a continuation, *k*, of the same spindle which turns in a tubular box, *l*, and passing through the surrounding casings, is provided with a thumb-and-finger piece, or wheel *m*, outside, by means of which arrangement the wick is adjusted readily from the outside. The bottom *m'* of the burner-chamber *n*, is about half an inch above the upper plate *c* of the oil-reservoir, so as to form an air-chamber, *o*, interposed between the flame and the oil-reservoir, and the cylindrical ring *p*, which surrounds this space, and which forms the periphery of the burner-chamber, is provided with three rows of holes—the lower row to admit air to the air-chamber *o*, the second to admit air to the burner-chamber *n*, to supply the wick below the deflector, and the upper row to supply air to the flame above the deflector, which deflector is represented at *q*, and is made to enclose entirely the flame-chamber by extending it so that its periphery fits the inside of the cylindrical ring *p*, below the upper range of holes. It is swelled up in conical form, and in the centre there is a boss which has a slot cut in it a little wider than the thickness of the wick for the passage of the flame, and in consequence of entirely surrounding the flame and enclosing the flame-chamber except the aperture for the passage of the flame, the currents of air which enter the flame-chamber are all deflected towards the burner to feed the flame, and no agitating currents are permitted to take place. The cylindrical ring *p* is surrounded by an outer cylindrical casing, *r*, leaving an annular space, *s*, between the two, closed at the bottom by the pedestal, and open at the top to the inside of the lantern. A little below the upper edge of the ring *p*, the outer casing spreads out in the form of a horizontal flanch as at *t*, and turns up as at *u*, to form a seat and enclosure for the lower metallic ring *v* of the lantern-glass *w*, which may be of the form represented or of any other suitable form. To the part *u* of the outer casing are hinged two horizontal levers *x x*, controlled by a spring, *y*, the tension of which forces inwards the outer ends of the levers, which are turned inwards and play through slots in the casing. The other ends of the said levers are so curved as to be both operated conveniently by the thumb and finger to contract the spring. When so operated the ring *v* of the lantern-glass *w* can be let down on to the seat, and then by letting go the levers the ends that play through the slots in the outer casing are forced inwards over the ring, thereby securing the globe to the pedestal. This it will be perceived entirely encloses the passages which admit air to the burner. The upper end of the globe is open, and provided with a ring, $a'$, having two ranges of holes, one, $b'$, in the lower part so that the entering currents of air have an upward direction, and must curve around the inner edge or rim $c'$ of the upper end of the glass, and the other, $d'$, above this, which enters above a deflecting ring, $e'$. The upper part of ring $a'$ has a central hole, $f'$, covered by a conical cap, $g'$. By these or equivalent means a provision is made for a supply of atmospheric air to feed the flame and for the escape of the products of combustion. The air which enters through the apertures at the top to the inside of the lantern or under the band $v$, as shown at fig. 2, passes down the annular space $s$, and thence enters through the series of holes in the cylindrical ring $p$ to the cooling-chamber $o$, and to the burning-chamber $n$, to supply the flame at the junction with the burner, and through the upper series of holes above the deflector to supply the flame above it, and to prevent any sudden downward current from affecting the flame, and as the supply of air can only reach the holes leading to these compartments by descending through the narrow annular space, the current supplied to the flame cannot be materially disturbed by any agitation outside the lantern. By reason of this mode of directing the currents, and the enclosure of the burner-chamber by the deflector, the flame is thoroughly protected against all disturbing influences outside, and the arrangement for controlling the wick from the outside of the lantern can be used under all circumstances and in all kinds of weather without danger of being extinguished or of smoking, while at the same time the oil is prevented from being heated by the interposition of the cooling-chamber. The glass-lantern or globe may be protected by metallic rods $h'$, or by other suitable means.

What we claim as the invention of the said CONRAD GERSTEN, and desire to secure by Letters Patent, as an improvement in lanterns, is—

1. The deflector $q$, constructed and operating substantially as and for the purposes specified.

2. The mode of controlling the current of air which feeds the flame by causing it to pass down in a narrow annular space or passage to the apertures leading to the burner, in combination with a deflector, substantially as specified.

3. Combining with the burner and the oil-reservoir, and interposed between the two, an air-chamber for preventing the oil from being overheated, as described.

WILLIAM WESTLAKE,
JAMES F. DANE.

Witnesses:
L. L. BOND,
A. T. SANGSTON.